United States Patent
Qu et al.

(10) Patent No.: US 7,692,357 B2
(45) Date of Patent: Apr. 6, 2010

(54) ELECTRICAL MACHINES AND ASSEMBLIES INCLUDING A YOKELESS STATOR WITH MODULAR LAMINATION STACKS

(75) Inventors: Ronghai Qu, Clifton Park, NY (US); Patrick Lee Jansen, Scotia, NY (US); Bharat Sampathkumar Bagepalli, Niskayuna, NY (US); Ralph James Carl, Jr., Clifton Park, NY (US); Aniruddha Dattatraya Gadre, Rexford, NY (US); Fulton Jose Lopez, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/014,137

(22) Filed: Dec. 16, 2004

(65) Prior Publication Data
US 2006/0131985 A1   Jun. 22, 2006

(51) Int. Cl.
*H02K 1/22* (2006.01)

(52) U.S. Cl. .................. 310/266; 310/114; 310/254.01; 310/166

(58) Field of Classification Search ......... 310/113–114, 310/129, 166–171, 254, 266
See application file for complete search history.

(56) References Cited

U.S. PATENT DOCUMENTS

| | | |
|---|---|---|
| 1,661,135 A | 2/1928 | Knight |
| 3,023,330 A | 2/1962 | Roters |
| 4,187,441 A | 2/1980 | Oney |
| 4,517,484 A | 5/1985 | Dacier |
| 4,720,640 A | 1/1988 | Anderson et al. |
| 4,866,321 A | 9/1989 | Blanchard et al. |
| 4,900,965 A | 2/1990 | Fisher |
| 5,004,944 A | 4/1991 | Fisher |
| 5,311,092 A | 5/1994 | Fisher |
| 5,331,244 A | 7/1994 | Rabe |
| 6,177,746 B1 | 1/2001 | Tupper et al. |
| 6,462,457 B2 | 10/2002 | Shah et al. |
| 6,590,312 B1 | 7/2003 | Seguchi et al. |
| 6,744,504 B2 | 6/2004 | Yokota |

(Continued)

FOREIGN PATENT DOCUMENTS

DE   4023791   7/1990

(Continued)

OTHER PUBLICATIONS

Ronghai Qu, "Dual-Rotor, Radial-Flux, Toroidally Wound, Permanent-Magnet Machines", 2003 IEEE Trans on Industry Applications, vol. 39, No. 6, pp. 1665-1673.

(Continued)

*Primary Examiner*—Thanh Lam
(74) *Attorney, Agent, or Firm*—Ann M. Agosti

(57) ABSTRACT

An electrical machine includes a rotor with an inner rotor portion and an outer rotor portion, and a double-sided yokeless stator. The yokeless stator includes modular lamination stacks and is configured for radial magnetic flux flow. The double-sided yokeless stator is concentrically disposed between the inner rotor portion and the outer rotor portion of the electrical machine. Examples of particularly useful embodiments for the electrical machine include wind turbine generators, ship propulsion motors, switch reluctance machines and double-sided synchronous machines.

20 Claims, 17 Drawing Sheets

U.S. PATENT DOCUMENTS

| | | | |
|---|---|---|---|
| 6,774,527 | B2 | 8/2004 | Furuse et al. |
| 6,794,781 | B2 | 9/2004 | Razzell et al. |
| 6,975,045 | B2 * | 12/2005 | Kurachi et al. ............. 290/44 |
| 2003/0193253 | A1 | 10/2003 | Arimitsu et al. |
| 2004/0041409 | A1 | 3/2004 | Gabrys |
| 2004/0119373 | A1 | 6/2004 | Akatsu |
| 2004/0135461 | A1 | 7/2004 | Miyake et al. |
| 2004/0195929 | A1 | 10/2004 | Oshidari et al. |
| 2004/0239199 | A1 | 12/2004 | Qu et al. |

FOREIGN PATENT DOCUMENTS

| | | |
|---|---|---|
| DE | 4402184 C2 | 11/1995 |
| DE | 19643362 | 10/1996 |
| DE | 19704652 | 2/1997 |
| DE | 19636591 | 12/1999 |
| EP | 1375913 | 1/2004 |
| EP | 1394406 A2 | 3/2004 |
| EP | 1465326 A2 | 10/2004 |
| FR | 2823178 | 4/2001 |
| JP | 53015502 | 2/1978 |
| JP | 56053557 | 5/1981 |
| JP | 56-074075 | 6/1981 |
| JP | 56017767 | 8/1981 |
| WO | WO9939426 A1 | 8/1999 |
| WO | WO 01/06623 | 1/2001 |
| WO | WO 01/21956 A1 | 3/2001 |
| WO | WO02/057624 A1 | 7/2002 |

OTHER PUBLICATIONS

US Patent Application, Entitled "Electrical Machine With Double-Sided Stator" by Patrick L. Jansen, et al.

US Patent Application Entitled "Electrical Machine With Double-Sided Lamination Stack" by Patrick L. Jansen, et al, U.S. Appl. No. 10/951,329, filed Sep. 27, 2004.

US Patent Application Entitled "Electrical Machine With Double-Sided Rotor" by Patrick L. Jansen, et al. U.S. Appl. No. 10/882,911, filed Jun. 30, 2004.

Edward Spooner, et al Modular, Permanent—Magnet Wind-Turbine Generators, 1996, IEEE, pp. 497-502.

USPTO Office Action for U.S. Appl. No. 10/951,329 mailed Aug. 18, 2005.

USPTO Office Action for U.S. Appl. No. 10/951,329 mailed Dec. 22, 2005.

EPO Search Report dated Jan. 16, 2006.

EPO Search Report dated Jan. 20, 2006.

* cited by examiner

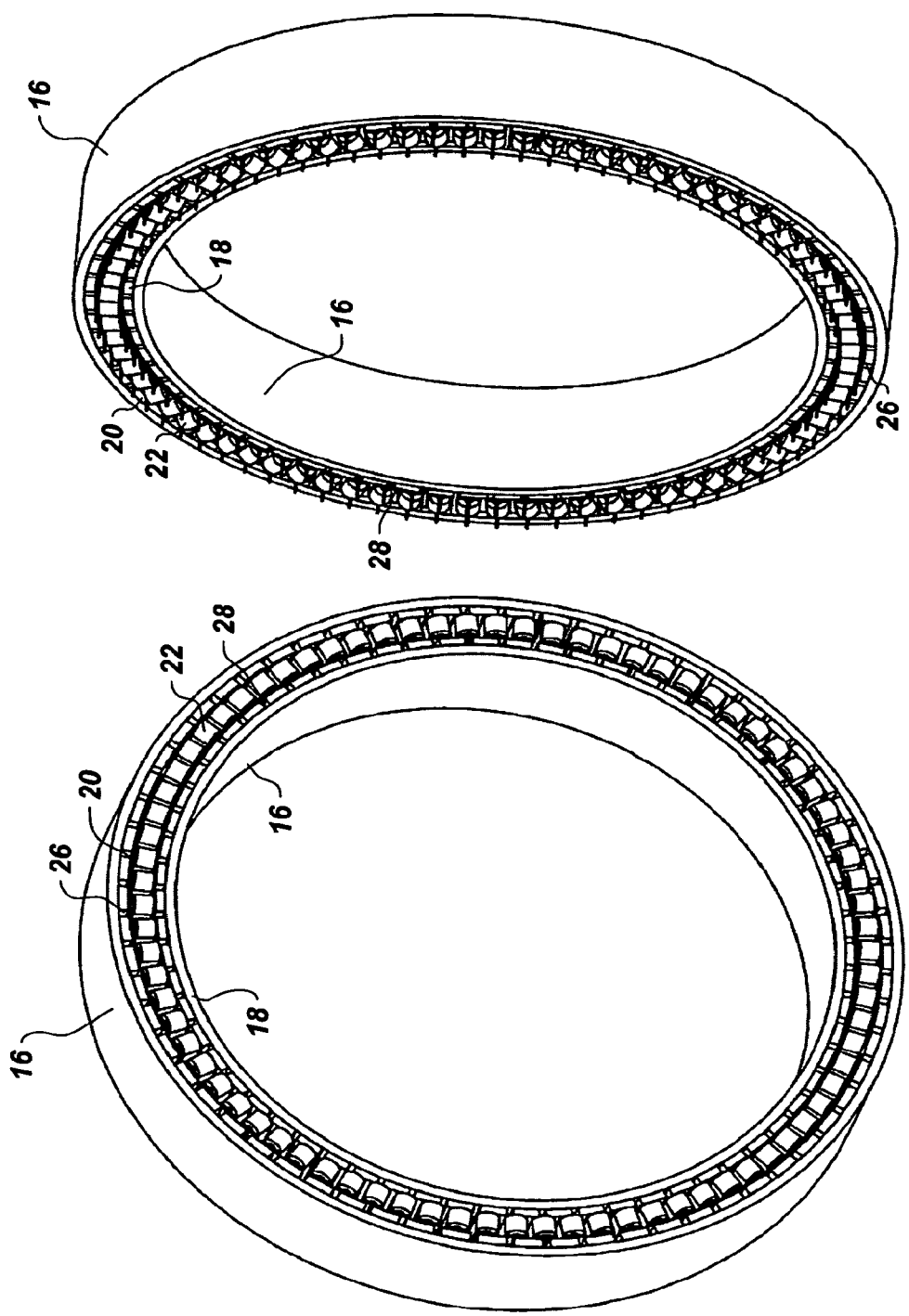

ELECTRICAL MACHINES AND ASSEMBLIES INCLUDING A YOKELESS STATOR WITH MODULAR LAMINATION STACKS

STATEMENT REGARDING FEDERALLY SPONSORED RESEARCH & DEVELOPMENT

This invention was made with Government support under U.S. Department of Energy sub contract number ZAM-4-31235-05 under prime contract number DE-AC36-99GO10337. The Government has certain rights in the invention.

BACKGROUND

The invention relates generally to radial flux electrical machines and more specifically to an electrical machine with yokeless stator and modular lamination stacks.

Electrical machines, i.e. generators and motors, are devices that transform mechanical power into electrical power, and vice-versa. Electrical machines for power generation, transmission and distribution provide power for industrial, business and residential requirements. For example, wind turbines are used to convert the kinetic energy in the wind into mechanical power. This mechanical power may be used for specific tasks (such as grinding grain or pumping water) or a generator may convert this mechanical power into electricity. A wind turbine usually includes an aerodynamic mechanism for converting the movement of air into a mechanical motion, which is then converted with a generator into electrical power.

The majority of commercially available wind turbines utilize geared drive trains to connect the turbine blades to the wind generators. The wind turns the turbine blades, which spin a shaft, which feeds into a gear-box and then connects to a wind generator and makes electricity. The geared drive aims to increase the velocity of the mechanical motion. The drawback of a geared drive is that it reduces the reliability of the wind turbine and increases the noise and cost of the wind turbine.

A few wind turbines utilizing direct-drive generators are also commercially available. Due to the low speed operation (due to the absence of a gearbox), these generators tend to be large in diameter. The large diameters of the direct drive generators present formidable transportation and assembly challenges, both at the factories and at the wind turbine installation sites. As the wind turbine industry matures and technology improves, larger power ratings will be required to continue the downward push in the cost of energy. Standard power ratings for land-based turbines are expected to be 3 MW or greater in the next few years, and the offshore turbines are expected to be 5 MW or greater.

For the wind turbines to evolve to higher power ratings, conventional approaches typically include an increase in the direct-drive generator diameter or axial (stack) length. Increasing the diameter is preferred from a purely generator electromagnetic perspective, but is not attractive from the transportation, frame, and assembly perspectives, especially for land-based turbines. Increasing the axial length of the generators, while maintaining the diameter to be less than approximately 4 meters, alleviates the land-based transportation issue, but results in complex and costly frame structures with long axial lengths.

In some double-sided direct-drive configurations the stator is fixed by the bolts through the holes in the stator yoke. The stator yoke is useful, for mechanical reasons, to mechanically link all the poles together and to fix the whole stator to a frame. The drawback in these configurations is that stator yoke adds more material mass into the stator and occupies additional space so that the inner airgap diameter is reduced due to the limited overall generator outside diameter. The resultant generator is heavy and expensive and requires expensive cooling methods.

Therefore there is a need for stator configurations resulting in smaller overall size for generators/motors, requiring less material and less expensive cooling techniques, without compromising on the power ratings.

BRIEF DESCRIPTION

Briefly, in accordance with one embodiment, an electrical machine includes a rotor with an inner rotor portion and an outer rotor portion, and a double-sided yokeless stator. The yokeless stator incorporates modular lamination stacks and is configured for radial magnetic flux flow. The double-sided yokeless stator is also concentrically disposed between the inner rotor portion and the outer rotor portion of the electrical machine.

In accordance with another aspect, a method of servicing a generator for wind turbine is provided. The method includes steps of removing a piece of end ring from a multi-piece end ring, and removing a core pack for servicing an individual lamination stack. A removable window is provided in a stator frame to access the core pack. The generator to be serviced includes a rotor with an inner rotor portion and an outer rotor portion and a double-sided yokeless stator. The yokeless stator includes multiple modular lamination stacks and is configured for radial magnetic flux flow. The yokeless stator also includes multi-piece end rings substantially surrounding the double-sided yokeless stator for increasing mechanical stiffness. The modular lamination stacks are arranged as different core packs, each core pack comprising one or more modular lamination stack.

DRAWINGS

These and other features, aspects, and advantages of the present invention will become better understood when the following detailed description is read with reference to the accompanying drawings in which like characters represent like parts throughout the drawings, wherein:

FIG. 2 illustrates a perspective front end view of the direct-drive double-sided permanent magnet (PM) generator of FIG. 1 with a yokeless stator;

FIG. 3 illustrates a perspective rear end view of the direct-drive double-sided permanent magnet (PM) generator of FIG. 1 with a yokeless stator;

DETAILED DESCRIPTION

The present invention includes different embodiments for modular-pole double-sided electrical machines with yokeless stators that are particularly useful for direct-drive wind turbines and ship propulsion motors. The different direct-drive configurations for wind turbines described herein below are based upon double-sided, radial-flux, synchronous electrical machines. Although permanent magnet (PM) machines are described and shown for the purpose of illustration, other electrical machines such as wound field synchronous machines or switch reluctance machines can alternatively be used. These configurations contribute towards achieving cost-effective wind turbines of increased power ratings (greater than 2.0 MW) and are especially advantageous for land-based applications where the outside diameter may be constrained by transportation limitations. Although power levels of greater than 2.5 MW are specifically stated, this invention is equally applicable and can be as beneficial for wind turbines of all sizes, including small-medium size wind turbines in the 50 kW to 500 kW range.

Figure 1:
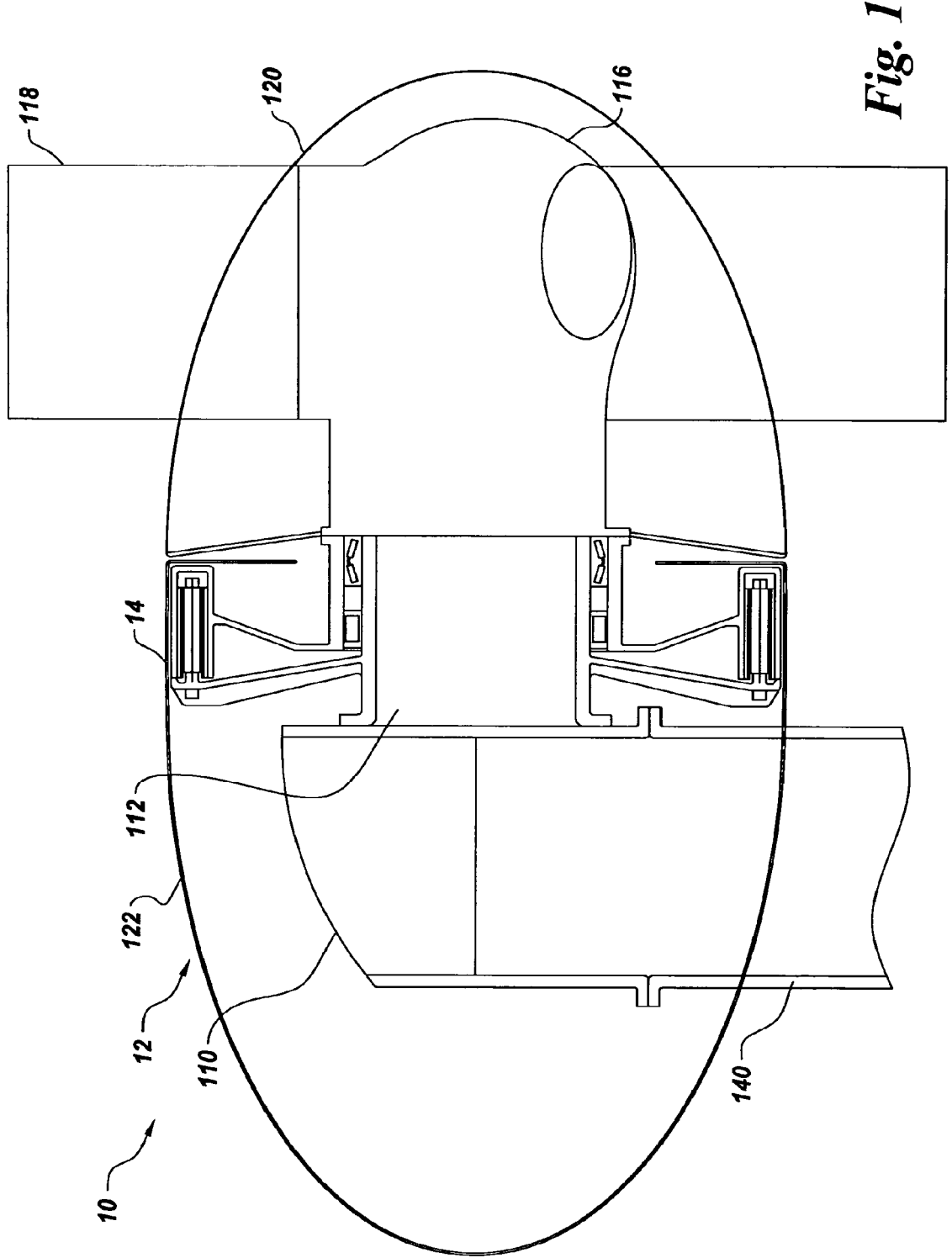
FIG. 1 illustrates a sectional view of a wind turbine including an exemplary direct-drive double-sided permanent magnet (PM) generator according to one embodiment.

Turning now to the figures, FIG. 1 is a diagrammatic representation of a sectional view of a wind turbine 10 as an exemplary electrical machine. The wind turbine 10 includes a nacelle 12 and an exemplary embodiment of a direct-drive double-sided PM generator 14. The PM generator 14 of the wind turbine 10 includes at least two concentric air gaps (not shown in FIG. 1 and discussed later in reference to FIG. 2), thereby effectively converting the PM generator 14 into two concentric generators. Thus, it would be appreciated by those skilled in the art that for the same total envelope defined by the outside diameter and axial length, the PM generator 14 can produce considerably more power output than as a single-sided generator. In practice, thus a 2 MW single-sided generator might be replaced by a double-sided generator capable of producing 3 MW to 3.6 MW for the same total diameter and axial length. Equivalently, a 3 MW single-sided PM generator having a diameter of 6 meters might be replaced with a double-sided generator of the same axial length with only a 4.3 meter diameter, thereby enabling land-transportation of the entire generator as one unit. The yokeless configuration of these generators achieves cost-effective wind turbines of increased power ratings (greater than 2.5 MW) based upon direct-drive generators that have a desirable physical envelope.

Referring again to FIG. 1, the PM generator 14 is mounted on a nacelle main frame 110 via a main shaft and bearing assembly 112. The nacelle main frame 110 is further mounted to a tower 140 through a conventional yaw bearing and gear drive system (not shown). More detailed features of the PM generator 14 are described herein below with reference to FIG. 2. A rotor blade hub 116 connects the wind turbine rotor blades 118 to the PM generator 14. A rotor hub cover 120 contains the wind turbine rotor blades 118 and other turbine rotor components. A nacelle cover 122 is also provided and it typically protects the components inside the nacelle from the environment.

FIGS. 2 and 3 illustrate the front end and rear end views respectively, of one embodiment of the modular-pole wind turbine generator 14. The generator 14 in FIGS. 2 and 3, includes a rotor 16 with an inner rotor portion 18 and an outer rotor portion 20, and a double-sided yokeless stator 22. The yokeless stator 22 is also concentrically disposed between the inner rotor portion 18 and the outer rotor portion 20 of the wind turbine generator 14. The yoke or back-iron of a stator in a conventional machine is the section of core steel that is designed to carry the circumferential component of magnetic flux that links the stator teeth. The yokeless stator 22 is seen to have no yoke or back-iron section, therefore the inner and outer rotor portions 18 and 20 are designed to carry the circumferential component of the magnetic flux linking the stator teeth. The generator 14 further comprises a stator frame 24 (shown in FIG. 9). The yokeless stator 22 is disposed between two rotating rotor portions 18, 20 inside and outside of the stator, respectively. The rotor portions 18, 20 are shown as, but not limited to, permanent magnet rotors. The inner rotor portion 18 is inverted relative to the outer rotor portion 20; i.e., the outer air gap 26 of the outer rotor portion 18 faces inwards, while the inner air gap 28 of the inner rotor 20, faces outward.

Figure 4:
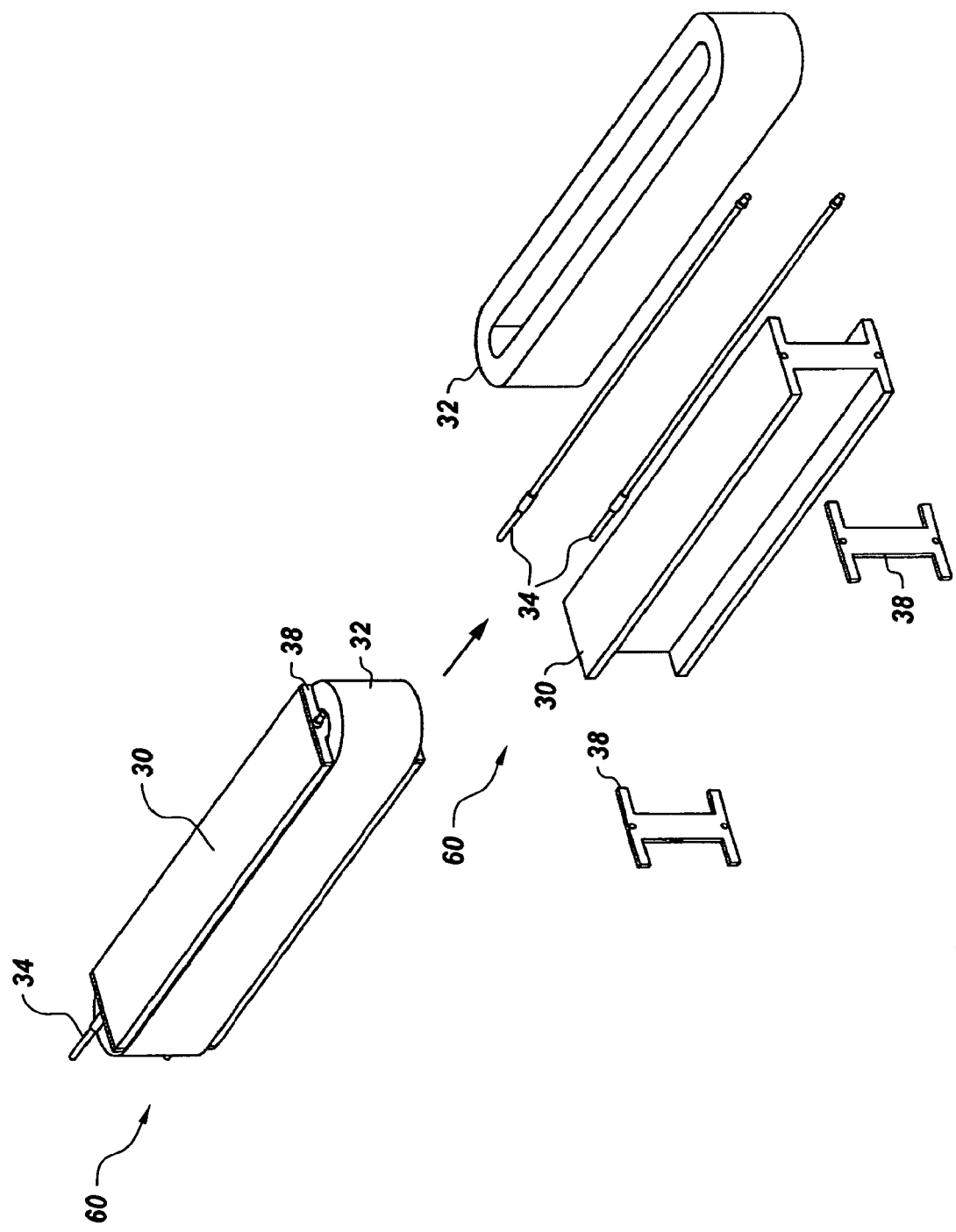
FIG. 4 illustrates an exemplary embodiment for the yokeless stator of FIG. 2 and FIG. 3 with one modular lamination stack and its exploded view.

FIG. 4 shows a view of one winding assembly 60 for the yokeless stator 22 and its blowout view. The stator 22 includes multiple winding assemblies 60, in which one or more coils 32 are wound around a respective modular lamination stack 30. In one embodiment, each respective modular winding assembly 60, as shown in FIG. 4, includes bolts 34 (non-ferromagnetic) for coupling the respective modular lamination stack 30 to the stator frame 24 (shown in FIG. 9). In a specific embodiment, each modular winding assembly 60 includes an I-shaped lamination stack 30. Semi-closed slots 50 (shown in FIG. 10) may be formed by the "I" shape laminations. Though two bolts are shown in FIG. 4, additional bolts may be used for each lamination stack 30 to increase mechanical stiffness depending on system requirements. The yokeless stator typically further includes end plates 38 as shown in FIG. 4, and the bolts 34 of the respective modular winding assemblies 60 may be secured to the end plates 38.

Figure 5:
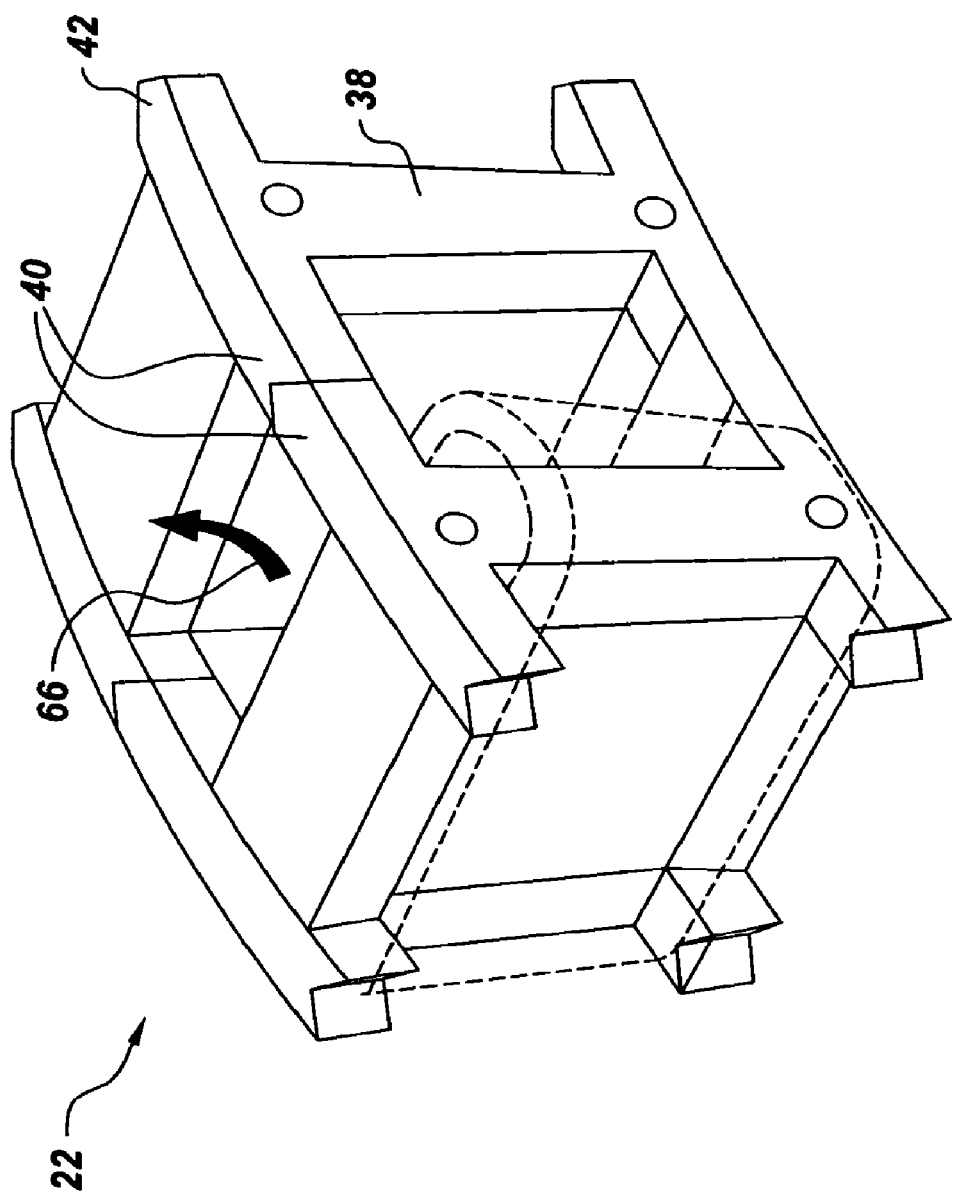
FIG. 5 illustrates another exemplary embodiment with end plates of the modular lamination stack having interlocking grooves.

In one example, as shown in FIG. 5, the end plates 38 include interlocking grooves 40 to prevent axial movement between adjacent modular lamination stacks. FIG. 5 shows circumferentially-oriented V-shaped modular end plates 42, which allow for (if needed) shear and other load transfer between adjacent core pieces and allow for torque and other loads to be transmitted to the stator frame 24 (shown in FIG. 9).

Figure 6:
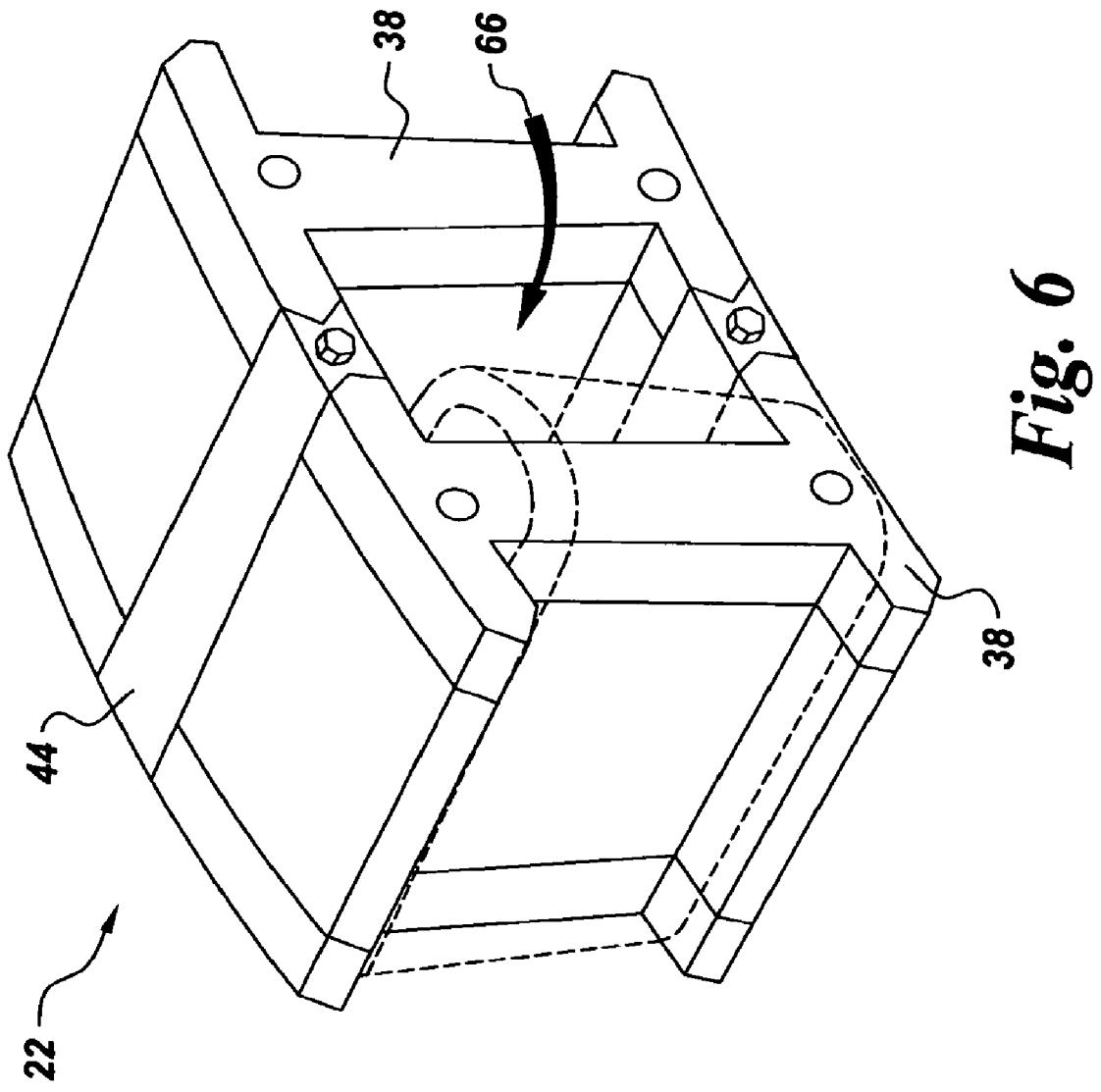
FIG. 6 illustrates another exemplary embodiment with a wedge disposed between adjacent end plates.

As shown in FIG. 6, the stator 22 may also include a wedge 44. The wedge may be disposed between respective adjacent end plates 38. The wedges, which may be made of non-magnetic materials, improve mechanical stiffness.

Figure 7:
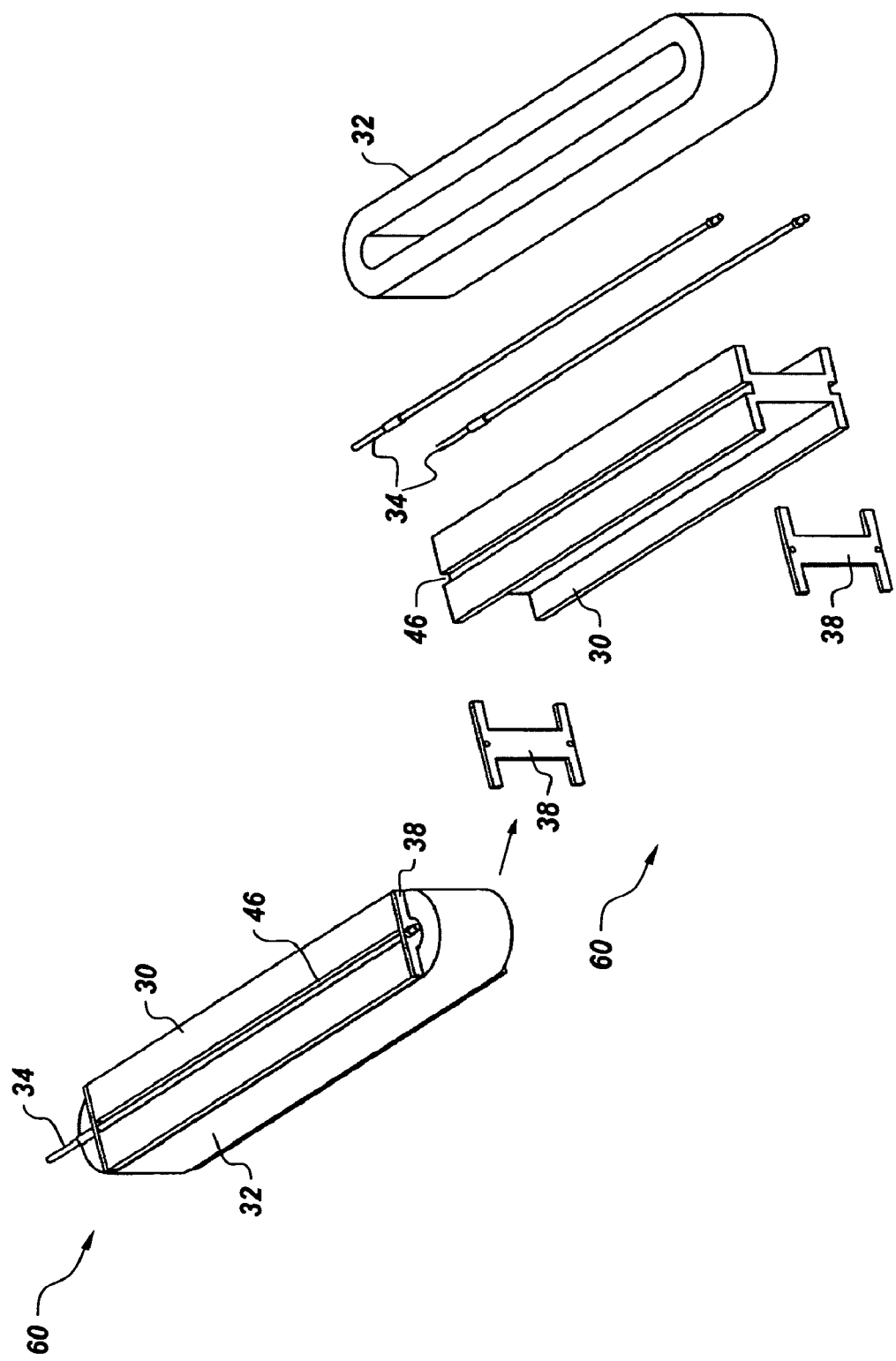
FIG. 7 illustrates another exemplary embodiment showing a mimic slot in each modular lamination stack.
Figure 9:
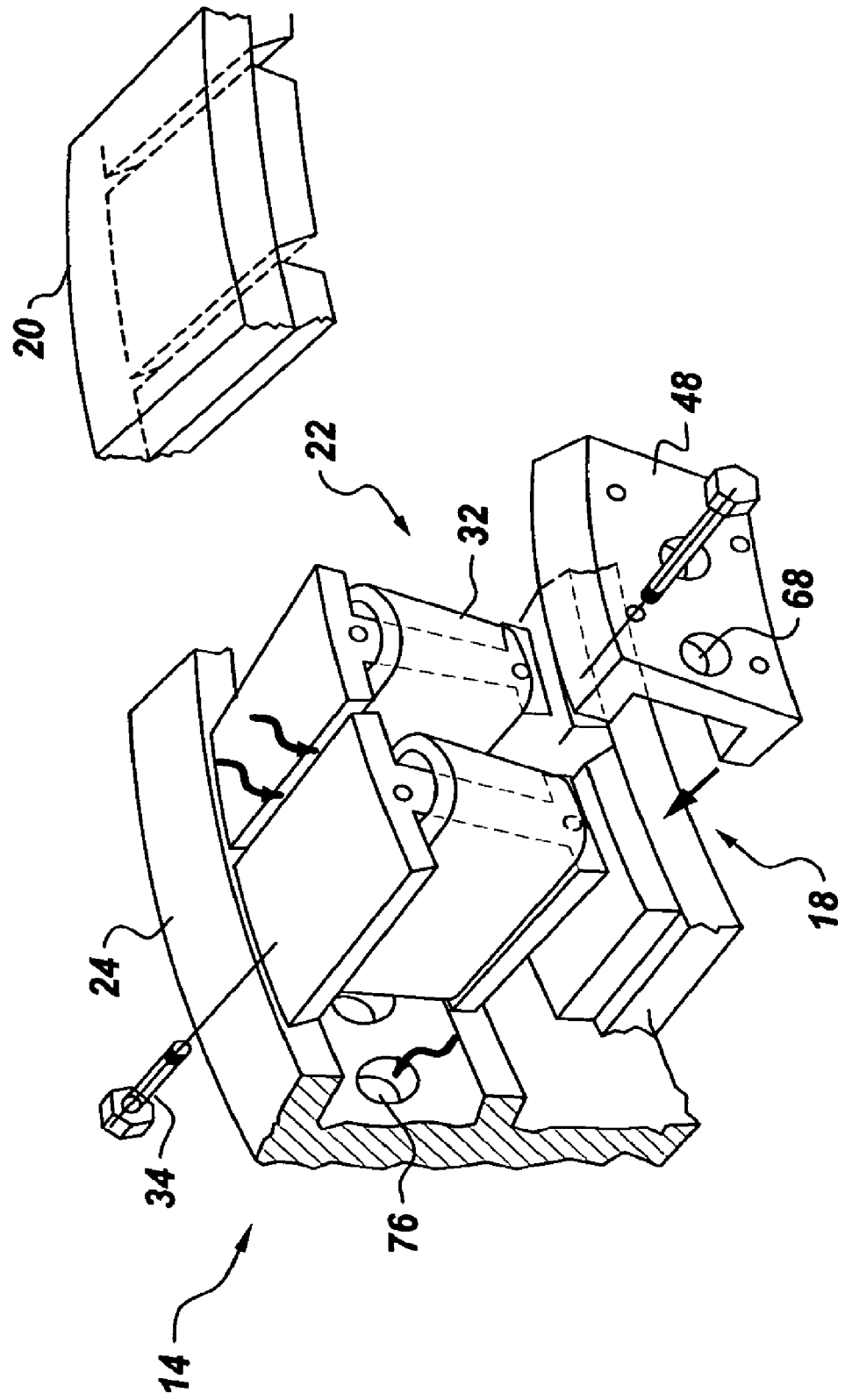
FIG. 9 illustrates a disassembled view of the yokeless stator 22 with some exemplary features from the configurations in FIGS. 4-8.

The stator 22 in another example, as shown in FIG. 7, includes at least one mimic slot 46 in each respective modular winding assembly 60 for placing the bolts 34 for coupling the respective modular winding assembly 60 to the stator frame 24 (shown in FIG. 9). Mimic slots are very shallow slots and typically used to reduce cogging torque. There are no windings in the mimic slots. The bolts 34 in the mimic slots 46 advantageously do not need additional space. The other features of winding assembly 60 and end plates 38 are similar to those described in reference to FIG. 4.

Figure 8:
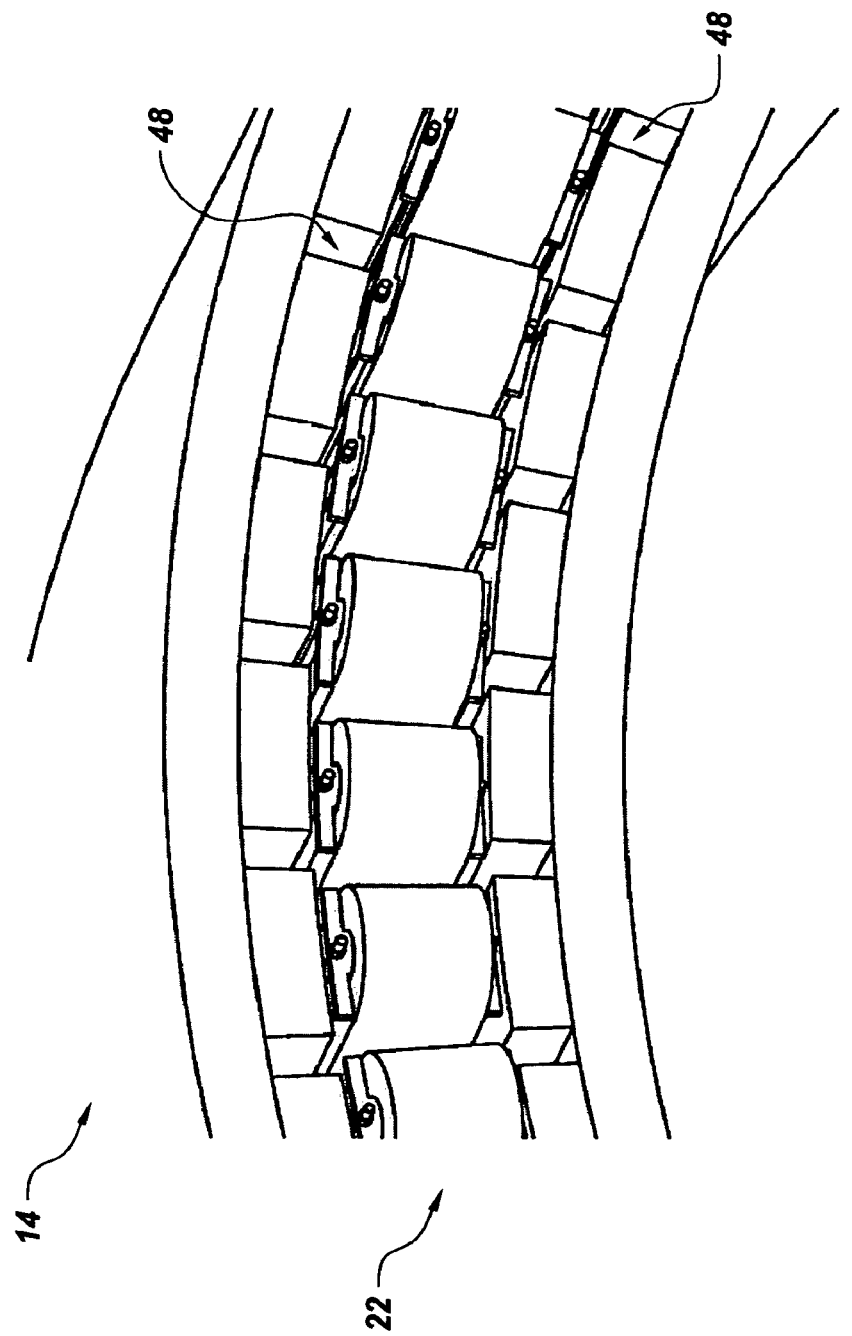
FIG. 8 illustrates another exemplary embodiment of the yokeless stator with end rings.

The wind turbine generator 14 as shown in FIG. 8 may also include end rings 48 substantially surrounding the double-sided yokeless stator 22 for increasing mechanical stiffness. In a specific example two end rings may be employed to further increase mechanical stiffness for extremely large and/or long stack machines. Each end ring may optionally be configured as a multi piece end ring.

FIG. 9 is a disassembled view of the stator 22 and inner rotor portion 18 and outer rotor portion 20 and with one wide end ring 48 to improve the mechanical stiffness. FIG. 9 also shows another method to fix the stator 22 to the stator frame 24 using bolts 34.

Figure 10:
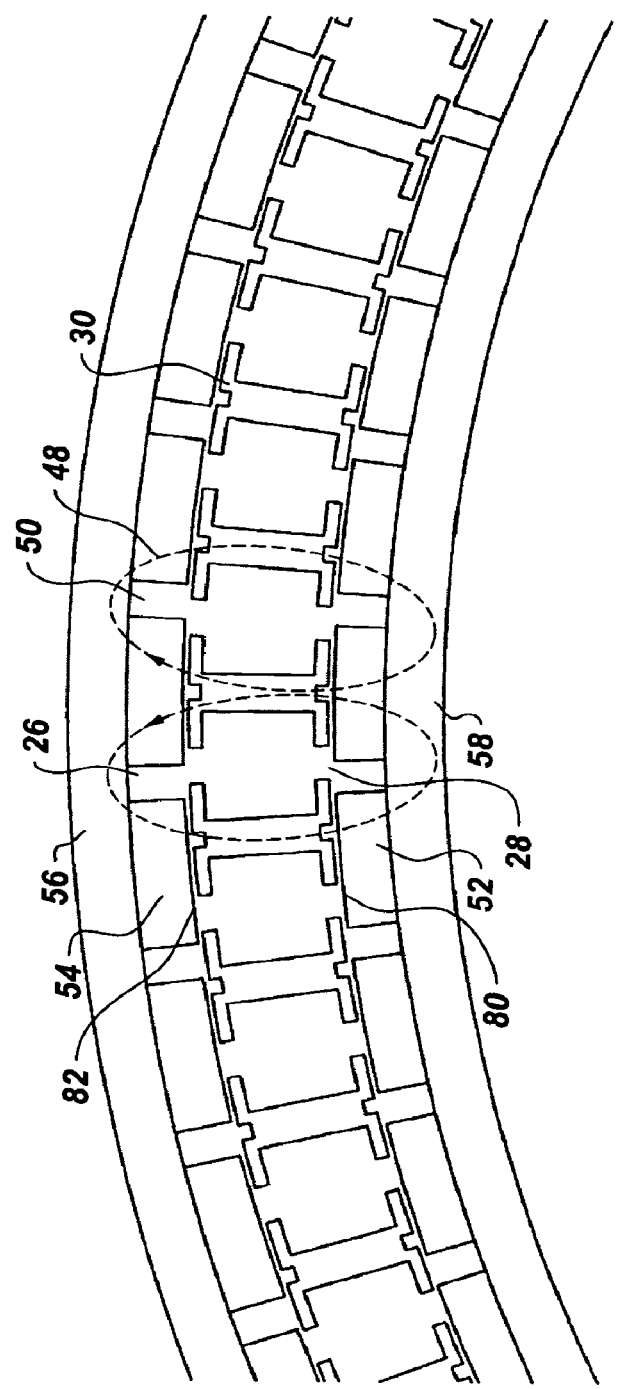
FIG. 10 illustrates an exemplary magnetic flux distribution path for the yokeless stator.

The yokeless stator 22 as shown in above embodiments is configured for radial magnetic flux 48 as shown in FIG. 10. In the embodiment shown in FIG. 10, the permanent magnets are arranged in such a way that the magnetic flux driven by one inner magnet pole 52 and one outer magnet pole 54 crosses the inner airgap 28, travels through one stator lamination stack 30 (stator tooth), and travels across the outer airgap 26 getting into the outer rotor yoke 56 through the outer pole cap 82 and magnet pole 54. The flux 48 then travels back to the inner rotor yoke 58, as shown in FIG. 10, through the adjacent outer magnet pole 54, outer pole cap 82, outer airgap 26, stator tooth 30, inner airgap 28, inner pole cap 80, and inner magnet pole 52. Semi-closed slots 50, which are also shown in FIG. 10, reduce airgap flux ripple. In such a magnet arrangement, no stator yoke is needed. The back EMF will be induced in each coil when rotor rotates due to the AC flux linkage in each coil. Therefore, electrical power is generated.

Figure 11:
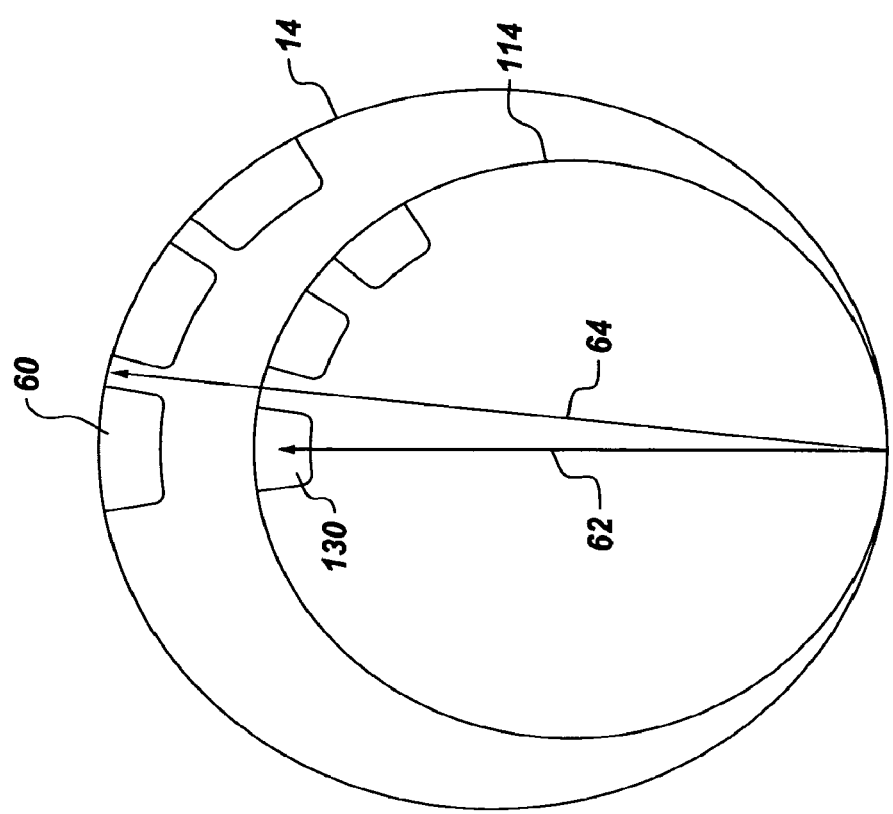
FIG. 11 illustrates a diagrammatic view of the modular lamination stacks usable for a family of generators of different diameters.

The modular winding assemblies shown as 60, 130 in FIG. 11 may be advantageously configured to have a shape which is usable in a family of generators 14, 114, at least some of the family of generators (14, 114) having different diameters 62, 64 than others of the family of generators as generally shown in FIG. 11. The generator 14 may have for example 96 slots and the generator 114 may have 90 slots resulting from different diameters. Thus the modular and yokeless stator structure make it possible to share a common lamination stack (winding assembly) for a family of generators. Since the laminations are modular, it is also possible to adjust airgap tooth by tooth. Since the physical airgap may now controlled by individual lamination stack, it may be advantageously possible to adjust the local airgap by adjusting each lamination stack. This is a desired feature for the large diameter generators.

Different cooling methods may be employed with the different stator configurations as shown above. In one example, as illustrated in FIG. 5 and FIG. 6 an axial or radial cooling air passage 66 is provided between adjacent modular lamination stacks. For example, when the lamination stack of FIG. 5 and FIG. 6 is used in the configuration of FIG. 2 and FIG. 3, radial air cooling may be used by pumping in air from the inner airgap 28, the air may radially pass through the gaps between winding assemblies 60, and then get sucked out from the outer airgap 26.

In yet another example for cooling the stator, as shown in FIG. 9, the air is axially pumped in from both the inner and outer airgaps (not shown). The air then turns 360 degrees at the other end of stator and flows back through the holes 68 in the end ring 48 and the gaps between coils 32 and then out through the holes 76 in the stator frame 24. Each of the end rings 48 may include cooling air passage vents 68. The arrows generally indicate the air flow directions. For this cooling method, no holes are needed in the rotor frame.

Figure 12:
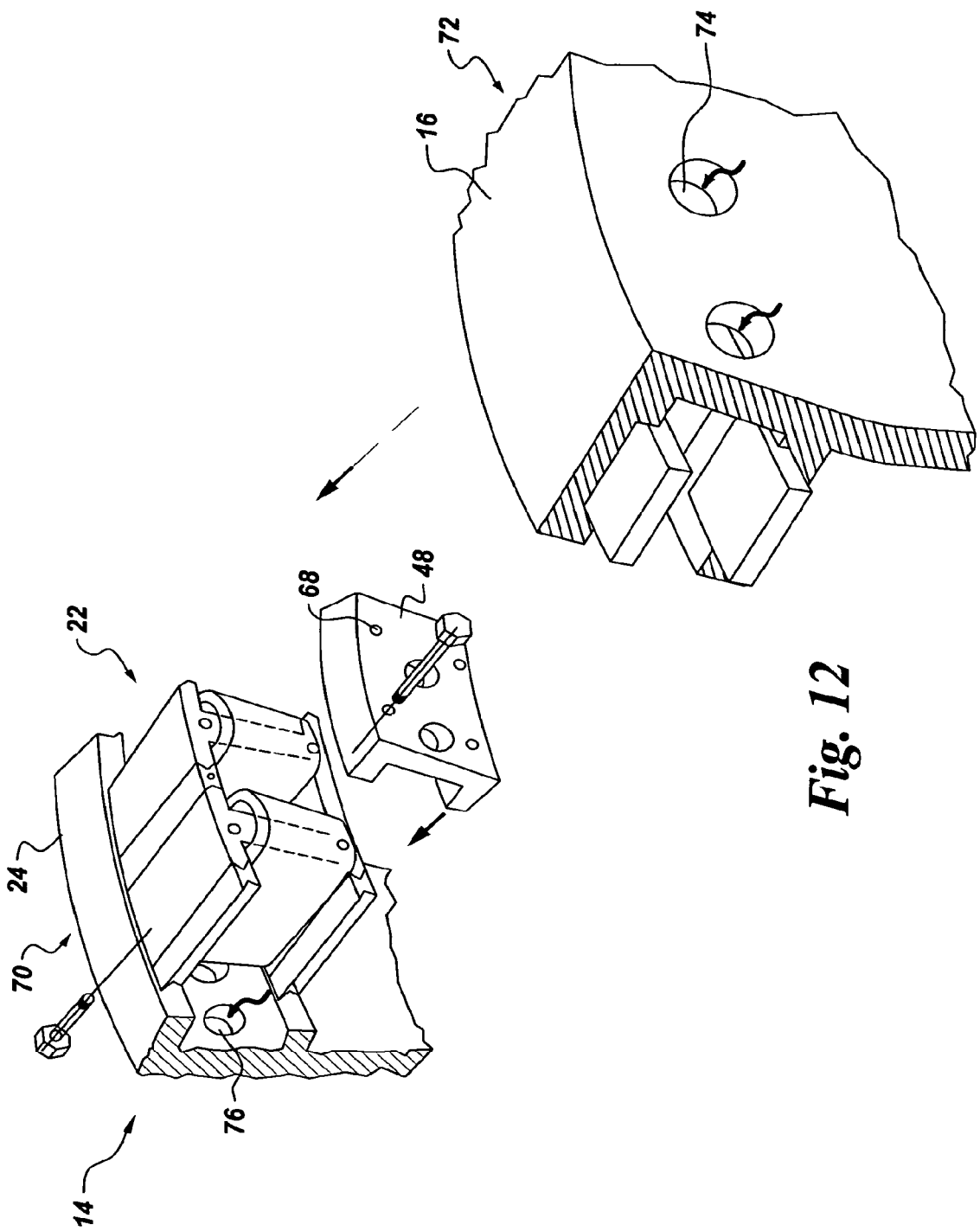
FIG. 12 illustrates a sectional view of the exemplary generator configuration showing the stator side and rotor side and an air cooling arrangement.
Figure 13:
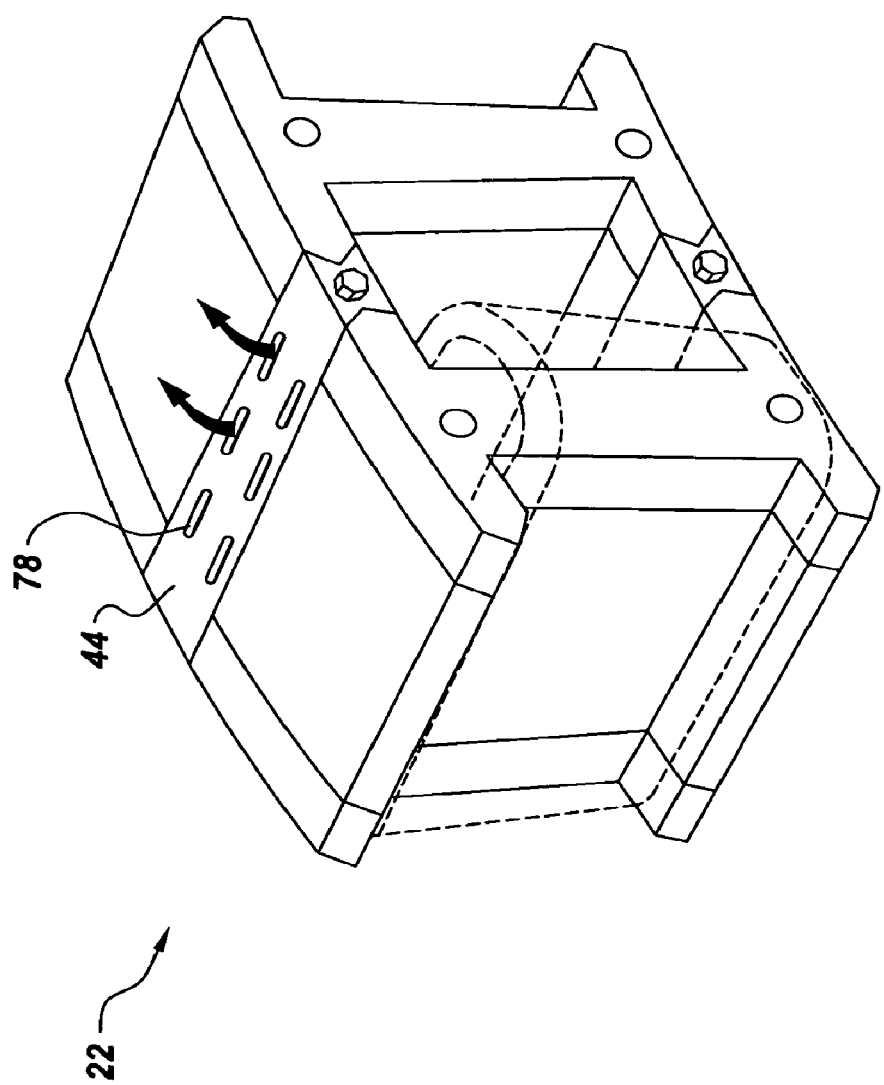
FIG. 13 illustrates another cooling technique with vents in the wedge.

In another cooling technique as shown in FIG. 12, the wind turbine generator includes a stator frame side 70 and a wind turbine side 72, and in one example the generator rotor 16 includes vents 74 to allow cooling air to flow axially from the wind turbine side towards the stator frame side while picking up heat from the copper and iron as it moves axially. Each of the end rings 48 may include cooling air passage vents 68. In a more specific example, each wedge 44 comprises cooling air passage vents 78, as shown in FIG. 13. The airflow direction shown by the arrows can also be reversed.

Figure 14:
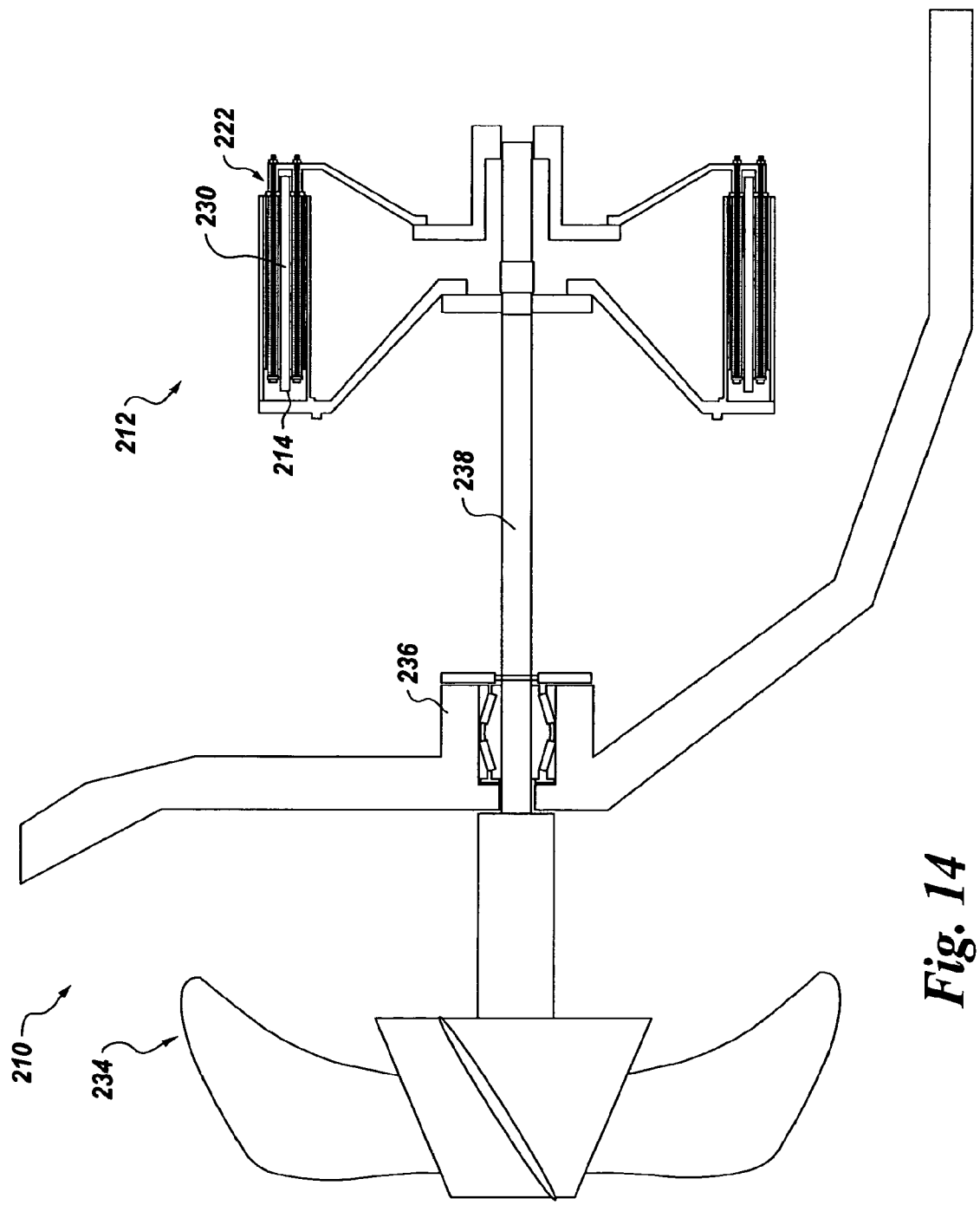
FIG. 14 illustrates a portion of an exemplary ship propulsion motor with a modular lamination stack for the double-sided yokeless stator.

Although embodiments of the present invention have been described primarily in terms of wind turbines, the concepts are additionally useful in other applications with one example being ship propulsion motors. FIG. 14 illustrates a sectional view of a portion of a ship 210 comprising an exemplary double-sided ship propulsion motor 212, a propeller 234, a mounting and bearing assembly 236, and a shaft 238. The ship propulsion motor 212 includes a rotor 214, and a double-sided yokeless stator 222 with the modular stator lamination stack 230 configured for radial magnetic flux flow. The double-sided lamination stack 230 is concentrically disposed between the inner and outer portions of the rotor 214. Many of the specific stator and rotor construction details including the cooling techniques are similar to the wind turbine embodiments and are not repeated here.

Figure 15:
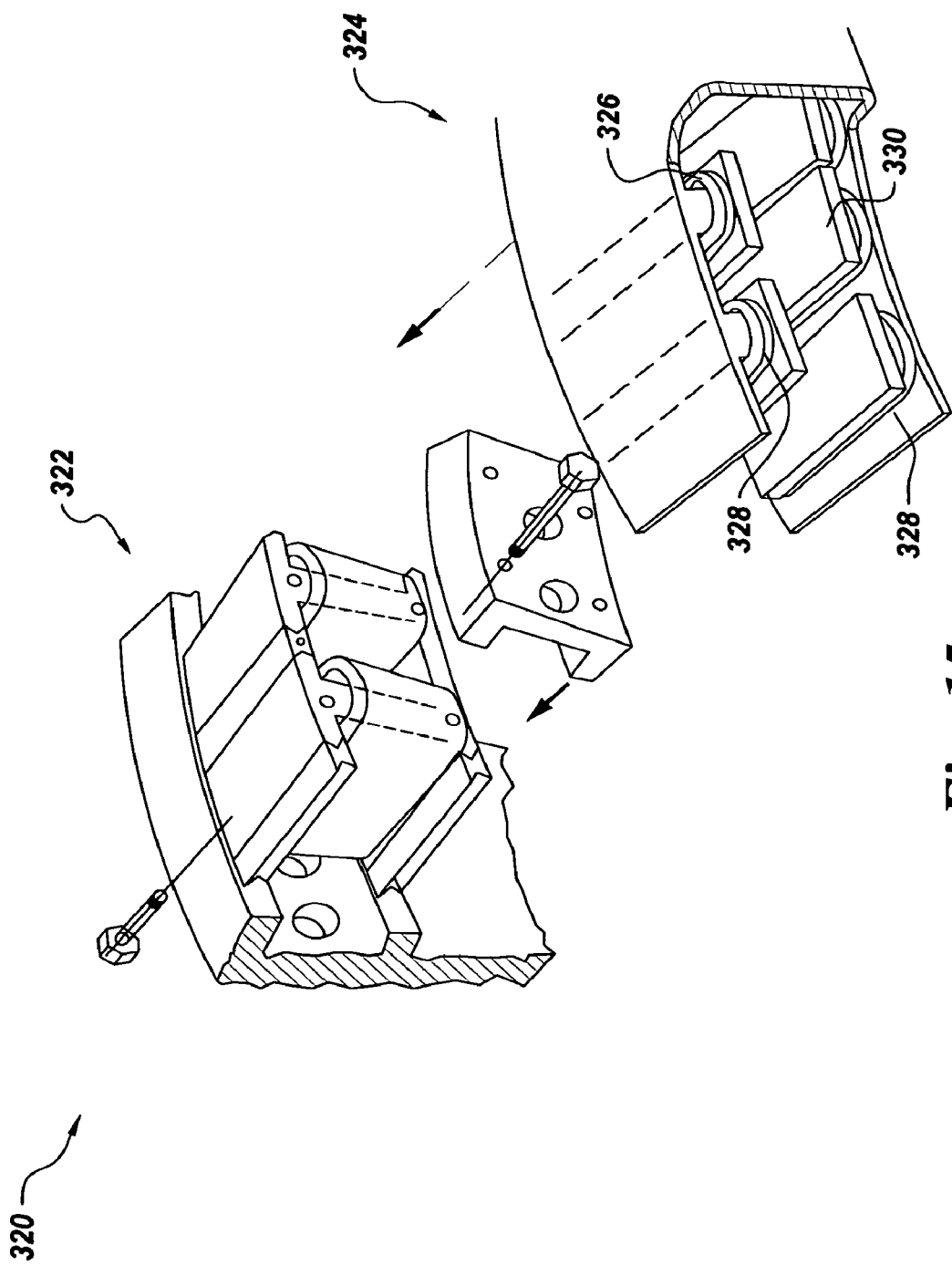
FIG. 15 illustrates an exemplary modular and yokeless stator for a double-sided wound-field synchronous machine.
Figure 16:
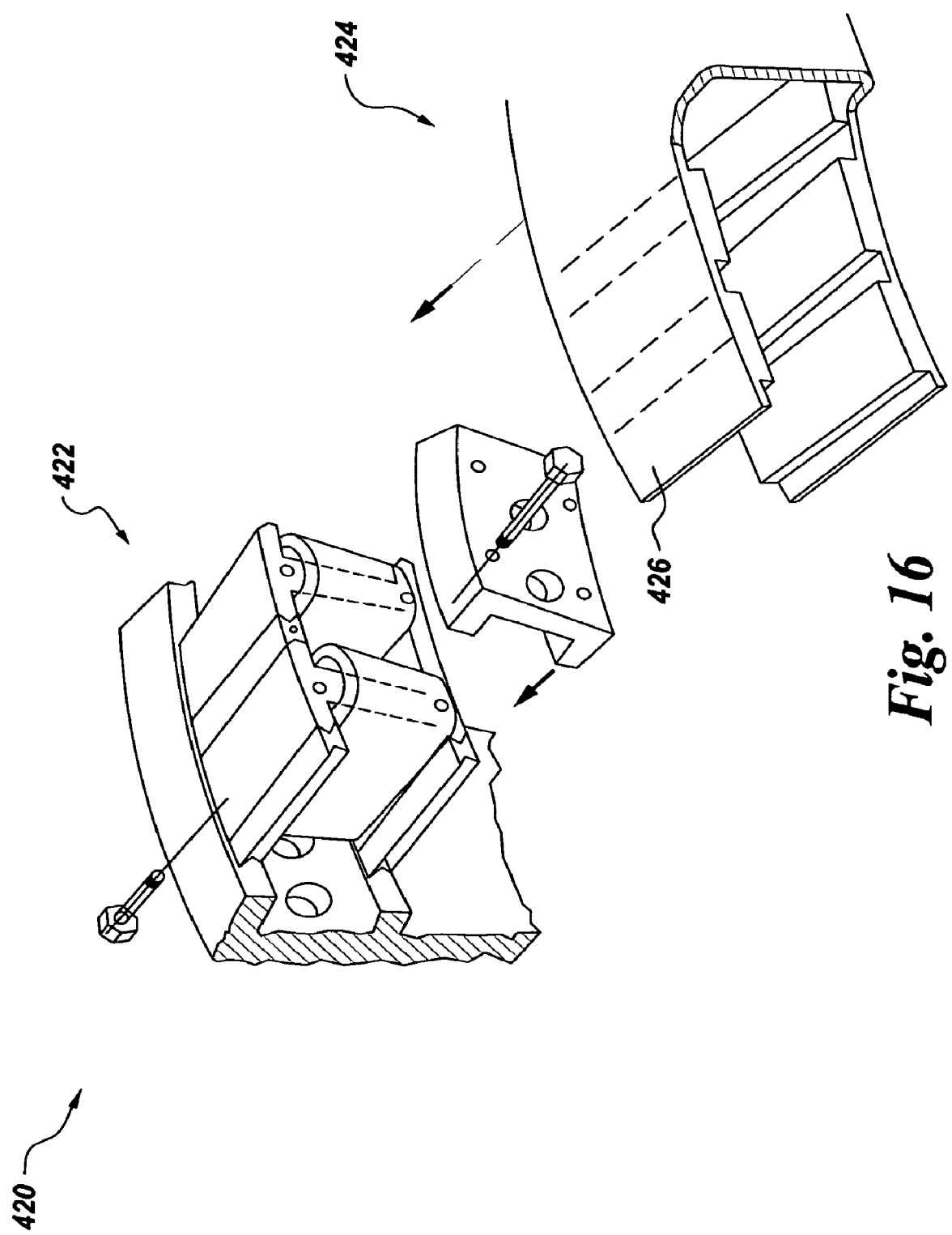
FIG. 16 illustrates an exemplary modular and yokeless stator for a switch reluctance machine.

FIG. 15 and FIG. 16 show sectional views of other examples of electrical machines which may advantageously utilize the modular and yokeless stator configurations as described with respect to wind turbine embodiments. FIG. 15 shows an exemplary double-sided synchronous machine 320 where the stator 322 is similar to the stator 22 of the wind turbine embodiments but the rotor 324 is a wound field rotor made of laminations 326 with coils 328 on each pole 330. FIG. 16 shows an exemplary double-sided switched reluctance motor 420. Again the stator 422 is modular and yokeless, similar to the stator 22 of the wind turbine embodiments but the rotor is switch reluctance rotor 424 made of laminations 426. Many of the specific stator and rotor construction details including the cooling techniques are similar to the wind turbine embodiments and are not repeated here.

Figure 17:
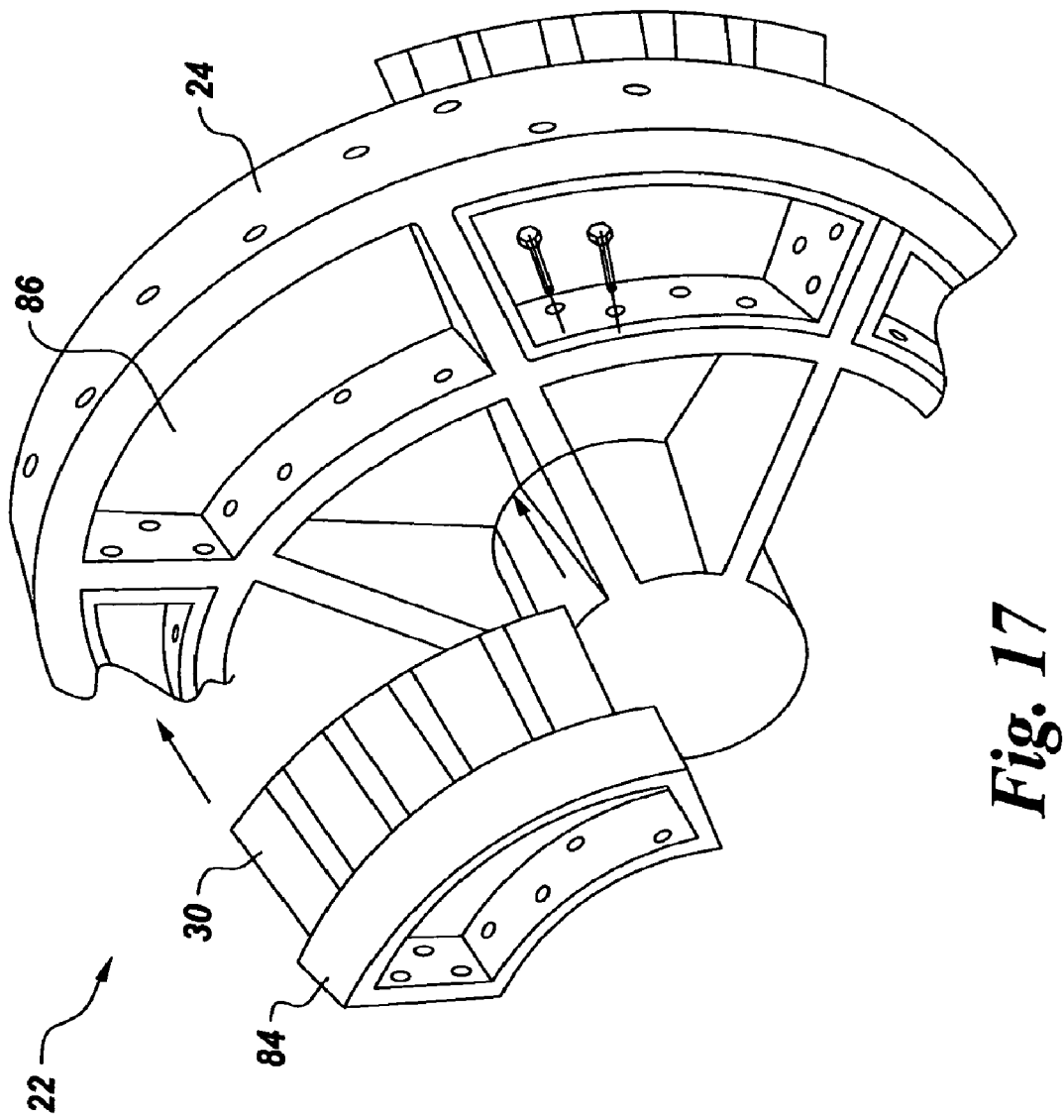
FIG. 17 illustrates a sectional view of the modular and yokeless stator of above configurations for the purpose of maintenance and assembly.

FIG. 17 illustrates a sectional view of the modular and yokeless stator of above configurations for the purpose of maintenance and assembly. FIG. 17 shows the lamination stacks arranged as different core packs 84 with each core pack comprising at least one or modular winding assembly 60. A service window 86, which may be a removable window is provided in a stator frame 24 to access the core pack 84. A few winding assemblies 60 may be assembled into core packs 84, and then placed on to frame 24 sub-structures. The core packs 84 may be removed one by one as needed, and the method for servicing is described in more detail herein below.

Figure 18:
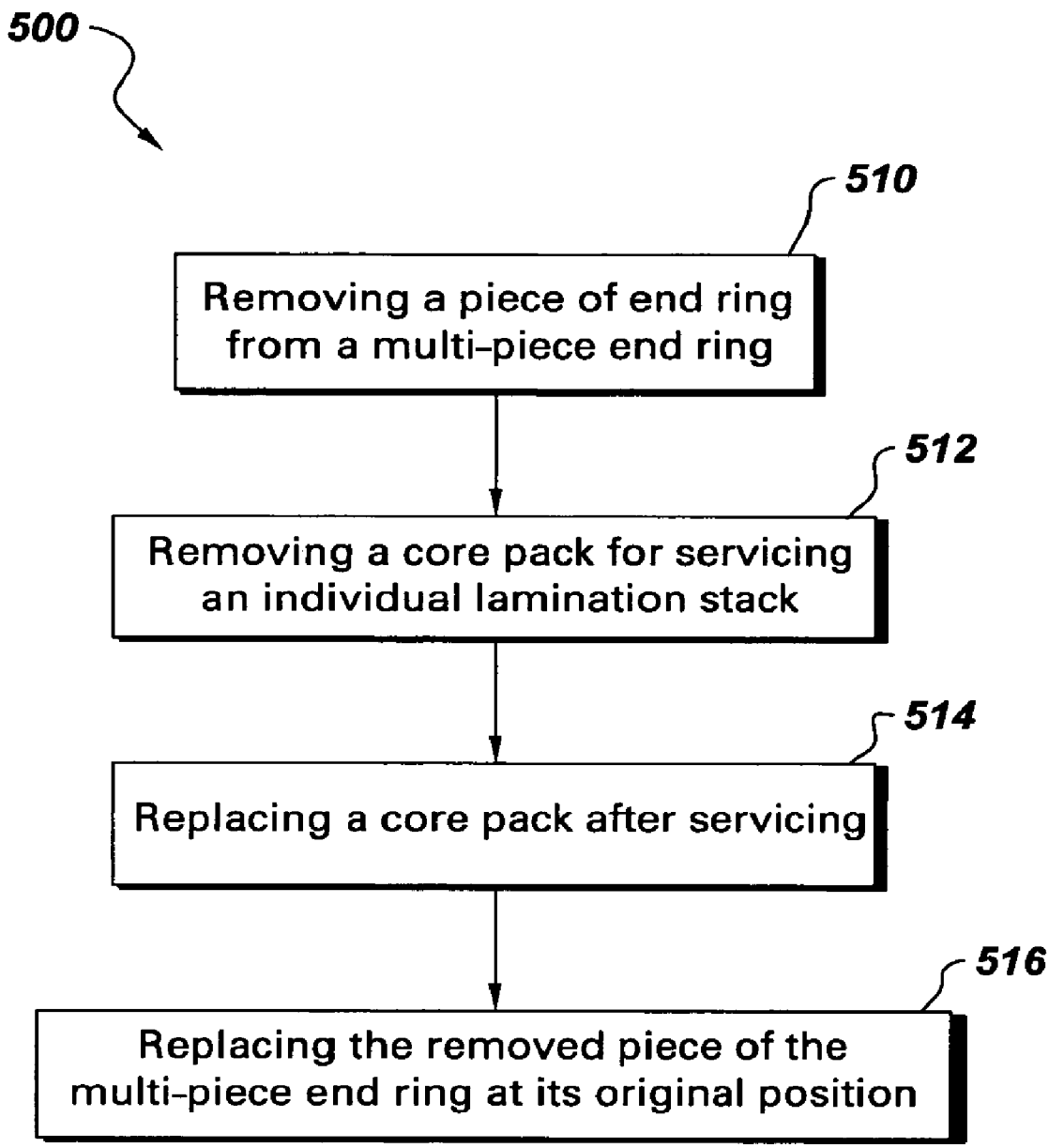
FIG. 18 illustrates an exemplary method for servicing the lamination stacks of the modular and yokeless stator of the above embodiments.

A method of servicing the yokeless stator as described above is shown as a flowchart 500 in FIG. 18. The method includes in one example removing a piece of end ring from a multi-piece end ring at step 510; and removing a core pack for servicing an individual lamination stack at step 512. For servicing individual lamination stacks, the core pack with the winding assembly to be serviced may be removed by unbolting the core pack from stator frame, and pulling it out from the window in the stator frame. The method further includes a step 514 for replacing the core pack after servicing; and a step 516 for replacing the removed piece of the multi-piece end ring at its original position. Alternately, the step 514 may include substituting a new core pack for the removed core pack. Step 516, may also alternately include substituting a new piece for the removed piece of the multi-piece end ring at its original position. The modular stator structure advantageously renders servicing of an individual stator stack without disassembly of the entire generator. The modular configuration also results in ease of assembly and less labor cost. It would be appreciated by those skilled in the art, that the yokeless modular-stator structure as described in various embodiments herein, provides substantial benefits over conventional stators that contain yokes.

For example, in the generator configurations described herein, the yokeless modular stator results in a smaller generator compared to a double-sided generator with a stator yoke. Since the stator yoke is removed, the inner airgap diameter may be enlarged for a given constant outer rotor outer diameter. Therefore, the inner rotor can produce more torque and power, which permits a shorter stack for a given power generator. And therefore, the overall generator length may be shorter. In some embodiments, the equivalent airgaps for both the inner and outer airgaps are reduced because of the use of semi closed slots (FIG. 10). This is advantageous since for a given airgap flux density, thinner permanent magnets may be used.

The configurations described herein are further advantageous as they result in smaller cogging torque. For semi-closed slots, the cogging torque may be reduced by optimizing the size of the slot openings. In a conventional large machine with open slots, the number of poles and slots are limited primarily by practical limits on the slot openings in the structure. For semi-closed slots embodiments described herein (FIG. 10), the airgap flux ripple may be much smaller than those in open slots. Therefore, the rotor pole losses due to the slot harmonics will be reduced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrical machine comprising:
a rotor with an inner rotor portion and an outer rotor portion; and
a double-sided yokeless stator comprising different core packs, each core pack comprising a modular lamination stack and configured for radial magnetic flux flow,
wherein the double-sided yokeless stator is concentrically disposed between the inner rotor portion and the outer rotor portion of the electrical machine; and
wherein the electrical machine further comprises coils, each coil being wound around a respective modular lamination stack.

2. The electrical machine of claim 1 wherein each of the modular lamination stacks comprises an I-shaped lamination stack.

3. The electrical machine of claim 1 wherein a gap between adjacent modular lamination stacks provides a radial cooling air passage.

4. The electrical machine of claim 1 further comprising an axial cooling air passage between adjacent modular lamination stacks.

5. The electrical machine of claim 1 wherein the stator further comprises a stator frame, and wherein each respective modular lamination stack comprises bolts for coupling the respective modular lamination stack to the stator frame.

6. The electrical machine of claim 5 wherein the stator frame comprises cooling air passage vents.

7. The electrical machine of claim 5 further comprising end plates, and wherein the bolts of the respective modular laminations stacks are secured to the end plates.

8. The electrical machine of claim 7 wherein the end plates comprise interlocking grooves to prevent axial movement between adjacent modular lamination stacks.

9. The electrical machine of claim 7 further comprising a wedge disposed between respective adjacent lamination stacks.

10. The electrical machine of claim 9 wherein each wedge comprises a cooling air passage vent.

11. The electrical machine of claim 5 further comprising at least one mimic slot at both the inner and outer surfaces of each respective modular lamination stack for placing the bolts for coupling the respective modular lamination stack to the stator frame.

12. The electrical machine of claim 1 further comprising end rings substantially surrounding the double-sided yokeless stator for increasing mechanical stiffness.

13. The electrical machine of claim 12 wherein each of the end rings comprises a multi piece end ring.

14. The electrical machine of claim 12 wherein each of the end rings comprises cooling air passage vents.

15. The electrical machine of claim 1 wherein the modular lamination stacks are configured to have a shape which is usable in a family of electrical machines, at least some of the family of electrical machines having different diameters than others of the family of electrical machines.

16. The electrical machine of claim 1, wherein the electrical machine comprises a permanent magnet generator.

17. The electrical machine of claim 1, wherein the electrical machine comprises a wind turbine generator.

18. The electrical machine of claim 1 wherein the electrical machine comprises a wound field synchronous machine.

19. The electrical machine of claim 1 wherein the electrical machine comprises a switch reluctance motor.

20. The electrical machine of claim 1 wherein the electrical machine comprises a ship propulsion motor.

* * * * *